June 2, 1970 — G. PACCARD — 3,515,166
SAFETY VALVES
Filed Jan. 5, 1968 — 3 Sheets-Sheet 1
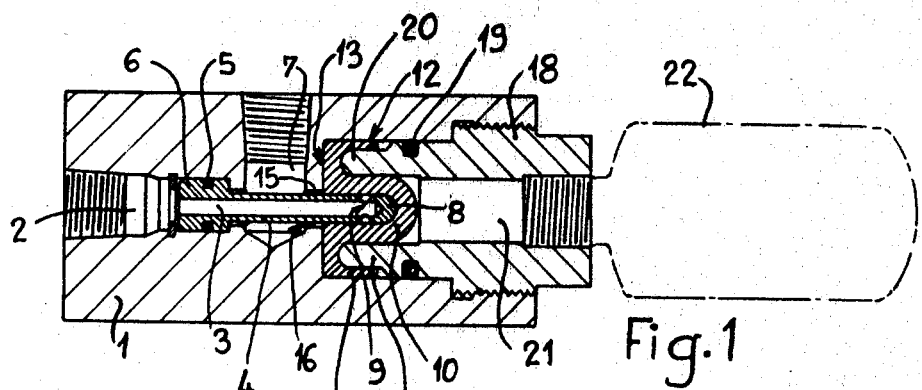
Fig. 1
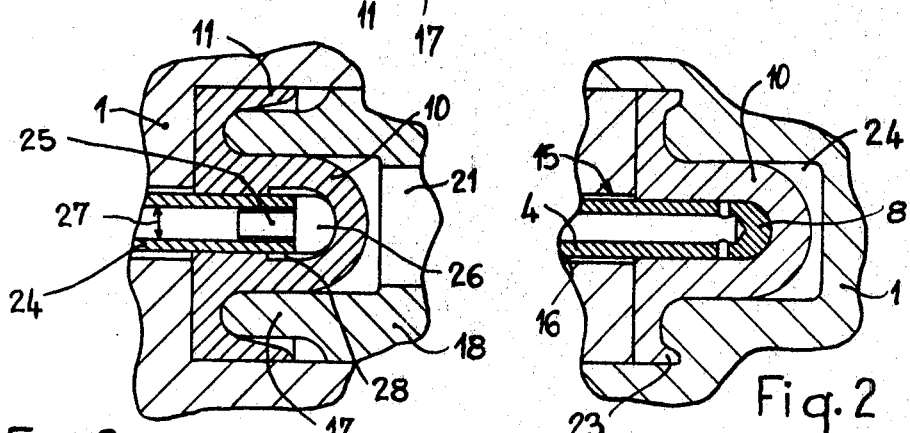
Fig. 3   Fig. 2
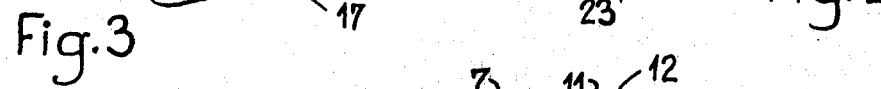
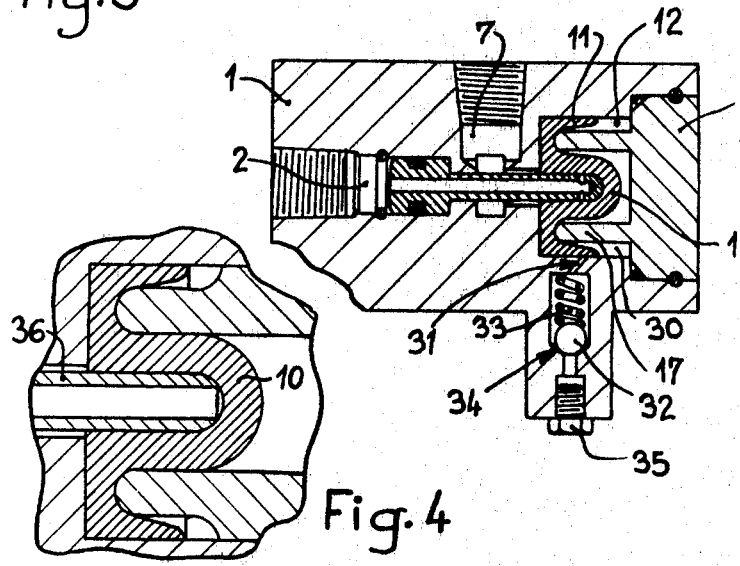
Fig. 5
Fig. 4
INVENTOR
Gilbert Paccard
BY Alexander & Dowell
ATTORNEYS June 2, 1970  G. PACCARD  3,515,166
SAFETY VALVES Filed Jan. 5, 1968  3 Sheets-Sheet 2

INVENTOR
Gilbert Piccard
BY Alexander & Dowell
ATTORNEYS

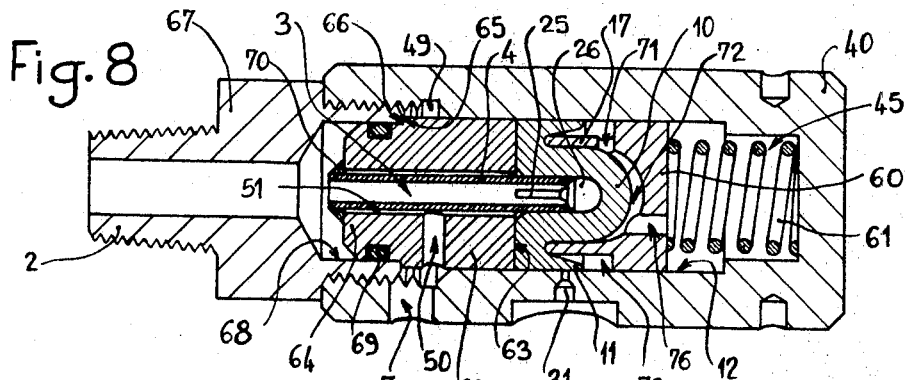
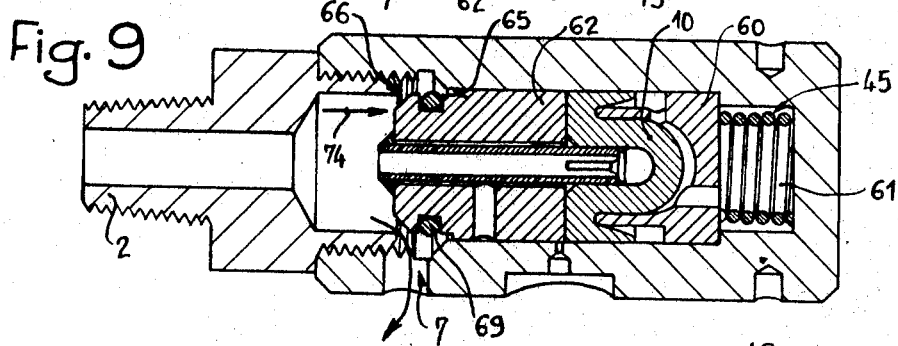
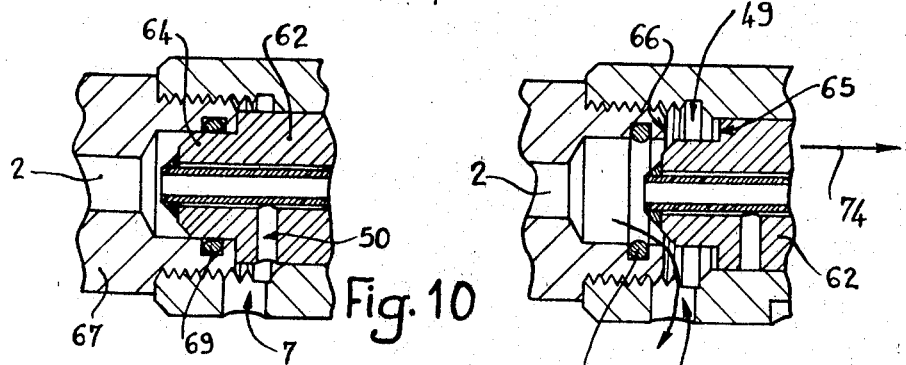
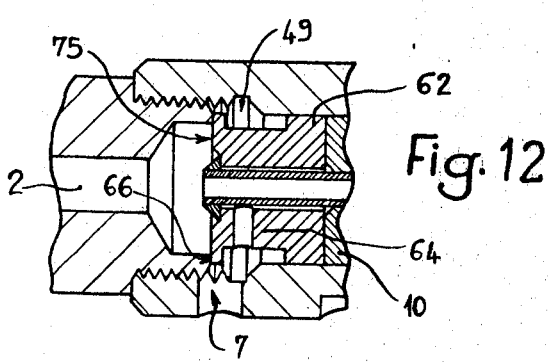

United States Patent Office 3,515,166
Patented June 2, 1970

1

3,515,166
SAFETY VALVES
Gilbert Paccard, Saint-Etienne, France, assignor to Bennes Marrel, Saint-Etienne, Loire, France, a French joint-stock company
Filed Jan. 5, 1968, Ser. No. 696,065
Claims priority, application France, Jan. 13, 1967, 48,160; June 28, 1967, 48,848; Oct. 30, 1967, 49,269
Int. Cl. F16k 15/14; E21d 15/51
U.S. Cl. 137—525                    12 Claims

ABSTRACT OF THE DISCLOSURE

In a hydraulic mine prop a safety valve comprising a hollow needle within which the prop liquid is fed under pressure, one or more apertures defined at or near the end of said needle, a flexible joint in the form of a sheath covering said apertures in the end of said needle, and elastic means to hold said joint in close contact with a peripheral cylindrical face of said hollow needle.

---

The present invention concerns improvements in or relating to safety valves which are fitted on hydraulic props in mines to permit their progressive contraction at the same rate as the roof sinks.

Known valves of this type comprise a plug member pressed resiliently on its seat and rising temporarily to evacuate a slight leakage as soon as the pressure exceeds a predetermined value within the main hydraulic circuit of the prop.

Conventional valves have various disadvantages, due particularly to the poor seal of the closure member on its seat after a certain period of service.

The principal object of the present invention is to avoid these disadvantages by providing a valve which comprises a sealing joint in the form of a cap capable of ensuring a long life of the valve.

A valve according to the present invention is such that pressurised liquid from the associated prop is fed into a hollow needle provided with one or more apertures enabling the liquid to escape by dilating the walls of a flexible joint in the form of a sheath or cap which covers the needle, against which it is kept by a resilient return force.

It will be noted that in a valve according to the invention, the joint and the needle have no axial movement, a feature which gives the unit a long life. The leak, when it occurs, appears only by radial dilatation of the joint.

To increase the life of the flexible joint, it is also possible to provide its rear portion with a rigid support permitting only partial dilatation. In this manner the elastic limit cannot be exceeded in the event of a large instantaneous pressure rise, and any risk of splitting the joint is eliminated.

According to another possible variation which is particularly suitable in workings caving in suddenly, giving rise to roof falls, the flexible joint is kept in position by the skirt of a metal sliding in the body of the valve against resilient return means, whilst the hollow needle is carried by a slide position which is sealed and normally kept applied to a fixed seat by the action of resilient return means, the piston being capable of displacement in the event of instantaneous excess pressure and rising from

2 its seat to bring the feed pipe for the liquid directly in communication with the transverse evacuation passage.

It will be understood that, when the leakage to be evacuated is only slight, the piston of the hollow needle remains in contact with its seat, thus ensuring that the valve operates similarly to what has been described above. However, if a fall of roof occurs, the instantaneously developed increased pressure moves the assembly of piston, needle and joint, thus directly uncovering the evacuation passage.

The resilient return means employed may be of any known type, such as a simple compression spring.

The attached drawings, given by way of example, will enable the invention, its features and advantages to be more clearly understood.

FIG. 1 is an axial section through a valve according to the invention.

FIGS. 2, 3 and 4 are partial views showing on a magnified scale the details of several different embodiments of the sealing joint and the hollow needle.

FIG. 5 shows alternative construction of the valve according to the invention.

FIG. 8 is an axial section showing a safety valve inoperative, provided specifically for workings in which roof falls are likely to appear.

FIG. 9 shows the same valve in the case of a serious instantaneous over-pressure.

Figure 6:
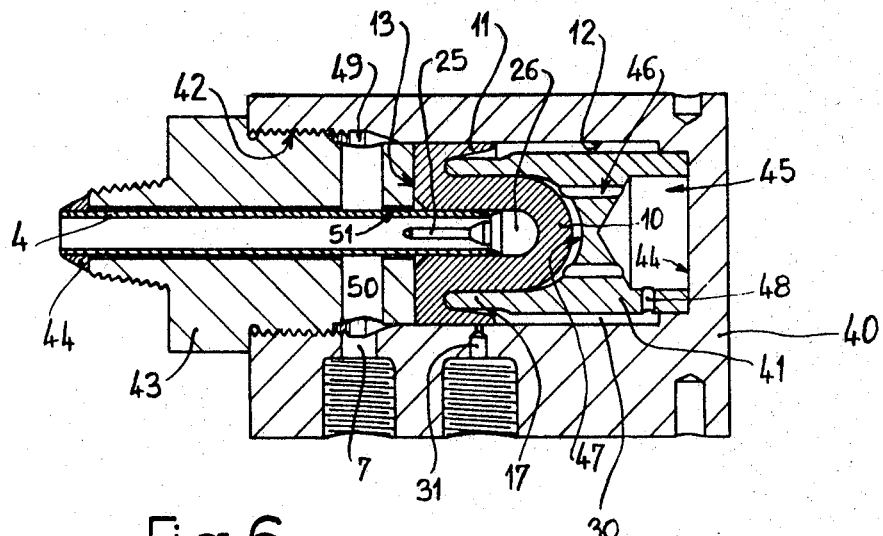
FIG. 6 is an axial section of a variant of construction, the flexible joint of which is kept in position by a rigid support member preventing any exaggerated dilatation.

FIG. 10 corresponds to FIG. 8 and shows another embodiment in which the sealing joint is not disposed on the piston but in a throat of the body.

FIG. 11 shows the same variation in the event of a serious instantaneous over-pressure.

FIG. 12 shows another possible embodiment in which the piston has a plane seal.

FIGS. 1 and 2 show a safety valve intended for a hydraulic prop of the type used on props in mines.

The pressurised liquid from the principal circuit of the prop is fed to a body 1 of the valve by a pipe 2. The pipe connects with an inner space 3 of a hollow needle 4 by which it is extended. An O-ring 5 seals the junction between an enlarged base 6 of the needle 4 and the body 1 of the valve. The needle 4 pasess through a transverse passage 7 which surrounds its centre portion, and emerges at one end of the side of the body 1.

The needle 4 is blind, that is to say, it is closed at its rounded end 8. In the proximity of this end 8, it has one or more radial bores 9 which pass through its wall.

In additon, the blind end 8 of the needle 4 is covered by a flexible joint 10 which has the form of a sheath or a cap. The joint surrounds the geometrical axis of the needle 4 and has a diametral section in the form of T. The periphery of the joint 10 defines an annular cylindrical lip 11 which is kept against the inner wall of a recess 12 provided within the body 1. The flat base of the recess 12 constitutes a shoulder 13 on which the flat base of the joint 10 is supported. The needle 4 passes through the body 1 in the centre of the shoulder 13 at the level of the bore 15 with a radial clearance 16.

To complete the assembly the interior of the recess 12 is engaged by a cylindrical skirt 17 connected to a screw plug 18 of which it forms an extension. The seal of the assembly is ensured by an O-ring 19.

The rounded terminal edge 20 of the skirt 17 bears against the bottom of the annular cavity defined by the joint 10 within its peripheral lip 11.

The screw plug 18 is traversed by an axial bore 21 to which a hydraulic or gas accumulator 22 or any other source of compressed fluid may be connected.

The operation is as follows:

When the interior of the bore 21 is filled with a fluid under pressure which may be a gas, a liquid or a more or less viscous body, the pressure is exerted over the entire surface of the joint 10 which is tightly applied (with a sealing effect) in particular against the outer wall of the blind needle 4. The joint 10 should preferably be of rubber, plastic material or any similar flexible material. Under the effect of the pressure, it blocks the bores 9.

As soon as the jack (not shown) is subjected by its prop to a thrust exceeding a predetermined value, the pressure rises within the pipe 2 and the hollow needle 4. This dilates the centre part of the joint 10 so as to open a passage as far as its base; the fluid then flows along the outer wall of the neede 4 as far as the radial clearance 16. This slight leak is evacuated through the passage 7, and the joint 10 automatically returns to its normal shape because of the pressure in the bore 21, as soon as the pressure with the fluid in the pipe 2 is sufficiently reduced.

Naturally, the exhaust pressure varies with the exterior pressure of the joint 10 on the needle 4. This exhaust pressure is regulated by predetermining the pressure within the bore 21.

FIG. 2 shows another embodiment in which the joint 10 has a cylindrical peripheral lip 23 which is shallow and is fitted in a recess formed directly on the body 1. The top of the joint 10, which is in the form of a cap, is then enclosed by a cavity 24 which contains a pressurised fluid.

The operation is similar to that described with reference to FIG. 1.

In the embodiment shown in FIG. 3, the blind needle 4 is replaced by a hollow needle 24 in the free end of which the guide rod 25 of a rounded plug 26 is engaged. The diameter of the rod 25 is slightly less than the inner diameter 27 of the hollow needle 24. The joint 10 which covers the plug 26 and the end of the hollow needle 24 defines at this point an annular cavity 28 in which leakage liquid may accumulate after having raised the plug 26. As in the previous case, the body of the flexible joint 10 is applied tightly with radial pressure against the outer wall of the hollow needle 24 by the compressed fluid in the bore 21 of the screw plug 18.

In the embodiment shown in FIG. 4, a hollow needle 36 is used, the rounded end of which is directly covered by the flexible joint 10.

FIG. 5 shows another embodiment in which the aforementioned skirt 17 is connected to a plug 29 placed in position permanently in the body 1 at the time of mounting. There is an annular cavity 30 between the outer wall of this cylindrical skirt 17 and the inner wall of the bore 12 in the body 1 in which the lip 11 of the joint 10 is placed. In its normal position the lip 11 closed a small lateral aperture 31 formed in the body 1 and communicating with the outside by a filling valve formed by a ball 32 held on its fixed seat 34 by a spring 33. A screw plug 35 is preferably mounted on the body 1 at the point where the pipe communicates with the outside.

By unscrewing the plug 35 it is possible to fix a pipe or an accumulator of the type indicated in FIG. 1 by the reference 22 to the body 1 for filling the cavity 30 and the space around the joint with compressed fluid. Under the pressure of the filling fluid, the ball 32 rises from its seat and the lip 11 separates from the wall of the bore 12, uncovering the apertures 31.

As soon as the source of pressurised fluid is cut off, the valve 32–33–34 closes automatically and the lip 11 closes the opening 31. The plug 35 is screwed into position and the slide valve is then ready to operate as described above.

Figure 7:
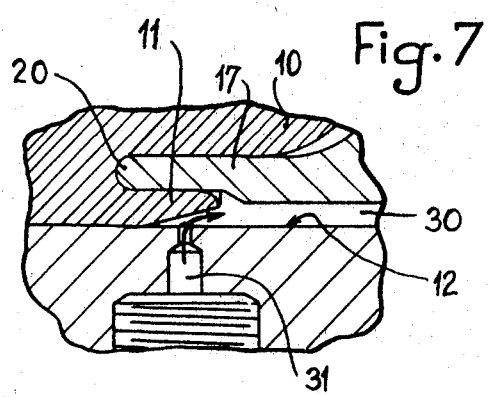
FIG. 7 is a partial view showing on a magnified scale the detail of the non-return system used for the inflation of the calibration chamber.

In FIGS. 6 and 7 an embodiment is shown for preventing excess dilatation of the joint. As in the aforementioned case, the liquid under pressure originating from the principal circuit of the prop is fed into a hollow needle 4. The latter is provided at its end with a rounded displaceable plug 26 provided with a rod 25. The unit is covered with a flexible joint in the form of a sheath or a glove finger. The joint has an annular cylindrical lip 11 which is held against the inner wall of a recess 12 in the body 40 of the valve. The flat transfer shoulder 13 which forms the bottom of this recess serves to support the joint 10 around the hollow needle 4.

The joint 10 is kept in position by means of the rounded edge 20 of the skirt 17 of a metal member 41 located within the body 40.

The body 40 is in the form of a large hollow member in which the recess 12 communicates with the exterior through a threaded inlet 32. The latter is provided with a plug 43 enclosing the hollow needle 4 at the end of which it is secured by welding at 44. Under these conditions the supporting shoulder 13 is formed by the inner end face of the plug 43. The recess 12 comprises a base 44 formed in the body 40 and to which the member 41 is applied. The latter is hollow so as to define a tight calibrating chamber 45 which communicates by longitudinal bores 46 with a depression 47 having a rounded base opening in the centre of the skirt 17. This depression covers the joint 10. When the valve is at rest, the rounded tip of the joint 10 is kept at a predetermined distance from the rounded base of the depression 47 and the bores 46 terminates in the resultant gap which then communicates with the calibrating chamber 41.

The outer wall of the skirt 17 is enclosed by an annular cavity and used to pressurise the valve from a lateral aperture 31 disposed behind the flexible lip 11. According to the invention, the annular cavity 30 communicates with the calibrating chamber 45 by a bore 48 provided for this purpose on the side of the member 41.

The return leak is effected through a transverse passage 7 provided in the body 40 and communicating with an annular chamber 49 which encloses the screw plug 43. The latter comprises a diametral bore 50 which connects the chamber 49 with a narrow gap 51 between the hollow needle 4 and the plug 43 which encloses it.

Experience has shown that it is preferable to construct the joint 10 of a flexible material having an appreciable degree of hardness, thus enabling it to withstand erosion whilst tolerating the deformations caused by the passage of the fluid. A suitable material is Adiprene containing a small percentage of a polymerisable resin of the type known under the trade name "Araldite."

The operation is as follows:

To operate the valve a gas is fed under pressure into the opening 31. The lip 11 plays the part of a non-return valve and it rises temporarily as shown in FIG. 2. The calibrating chamber 45 is thus inflated to the desired pressure. As soon as the feed stops, the lip 11 resiliently closes the aperture 31 again.

When the pressure of the fluid within the hollow needle 4 exceeds the selected value, the plug 26 rises and the joint 10 dilates, thus permitting a small quantity of liquid to flow out along the gap 31 and then through the passage 7.

In the event of excessive over-pressure, the rounded base of the impression 47 limits the amplitude of dilatation and thus prevents the joint 10 from splitting.

FIGS. 8–12 show several variations of an embodiment specially provided for workings liable to cave in suddenly, thus resulting in an instantaneous and large discharge of liquid.

As in the preceding variations, the pressurized liquid from the principal circuit of the prop is fed through a pipe 2 into a hollow needle 4. The latter is provided at its end with a displaceable rounded plug 26 fitted with a rod 25. The unit is covered by a flexible joint 10 in the form of a sheath or a glove finger. The joint is provided with an annular cylindrical lip 11 which is kept applied to the inner wall of a recess 12 in the body 40 of the valve.

The skirt 17 of a metal member 60 keeps the joint 10 in position within the lip 11.

The member 60 slides freely within the recess 12 and it is held against the joint 10 by a compression spring 61 which is supported on the base of the body 40.

The hollow needle 4 is connected to a piston 62 which also slides within the cylindrical recess 12. The piston 62 terminates at one end in a plane face 63 over the entire surface of which the joint 10 bears annular shoulder 65. The shoulder rests on a seat 66 of the same shape formed on the end of a fixed socket 67. The latter is connected to the feed pipe 2 and it is screwed into the body 40 of the valve. The fixed socket 67 defines an inner bore 68 in which the socket 64 of the piston 63 slides tightly. The seal is ensured by an O-ring 69 disposed in a throat of the socket 64.

The needle 4 is located within the piston 62 with which it defines a narrow gap 51. It is sealed by welding at 70 on the free end of the sliding socket 64.

The gap 51 communicates with a radial bore 50 formed in the piston 62. Annular chamber 49 is provided in the body 40 about the piston 62 and the bore 50 communicates therewith. The chamber 49 communicates with the transverse passage 7 for the return leak.

The inner space 3 of the hollow needle 4 communicates directly and permanently with the feed pipe 2.

The sliding member 60 comprises at least one bore 76 through its base and the bore 71 in the skirt 17. In this manner free communication of the chamber 45 is ensured, said chamber surrounding the spring 61 with cavities 72 and 73 defined between the member 60 and the various parts of the joint 10.

The cavity 73 is separated by the flexible lip 11 from a lateral opening 31 used as above to inflate the valve by means of a compressible fluid defining a gaseous cushion in the chamber 45 and in the cavities 72 and 73.

The operation is as follows:

When the valve is at rest the shoulder 65 of the piston 62 rests on its fixed seat 66. The joint 10 ensures a seal relative to the liquid contained in the inner space 3 of the hollow needle 4.

If the prop sinks slowly, the piston 62 remains resting on its seat 66 under the joint thrust of the calibrated spring 61 and the cushion of gas, whilst the joint 10 expands from the needle 4, allowing the liquid to leak through the gap 51 and the bore 50 to the evacuation passage 7.

If a fall of roof suddenly occurs, the heavy over-pressure developed instantaneously moves the unit formed by the piston 62, the joint 10 and the slide member 60 in the direction of the arrow 74. This movement is effected by compressing the spring 61 and the gas cushion in the chamber 45.

The shoulder 65 is thus separated from its seat 66 and the feed pipe is directly connected to the evacuation passage 7, making it possible to discharge liquid rapidly. This exceptional method of operation may be accompanied by deterioration of the O-ring 69, which should then be replaced.

FIGS. 10 and 11 show another embodiment in which the displaceable socket 64 of the piston 62 has a smooth cylindrical peripheral wall. Under these conditions the O-ring joint 69 is located within a recess formed in the fixed socket 67.

Operation is effected in a similar manner, that is to say in the event of a serious over-pressure, the piston 62 is pushed back in the direction of the arrow 74 (FIG. 11) thus bringing the feed pipe 2 into direct connection with the evacuation passage 7. In this case also the ring 69 must usually be replaced after each fall of roof.

FIG. 12 shows another possible embodiment in which the piston 62 defines a plane seal on its annular seat 66. In this case the displaceable socket 64 has a plane terminal face 75 which is applied to the seat 66.

In case of instantaneous over-pressure, the plane face 75 is separated from the seat 66 to place the pipe 2 in direct communication with the evacuation passage 7.

It should be understood that the above description has been given only by way of example and in no way limits the scope of the invention, which would also include replacement of the described details of construction by any other equivalent details.

In particular, the scope of the present invention would include the use of a socket or joint of any form, corresponding for example to the variants shown in FIGS. 1, 2 and 3 in the case of a demountable flap valve such as that shown in FIG. 4.

I claim:

1. In a hydraulic mine prop a safety valve comprising a hollow needle within which the prop liquid is fed under pressure, one or more apertures defined at or near the end of said needle, a flexible joint in the form of a sheath covering said apertures in the end of said needle, and elastic means to hold said joint in close contact with a peripheral cylindrical face of said hollow needle, said elastic means including a transverse shoulder, rounded edge of a cylindrical skirt, and a screw plug co-axial with said hollow needle and connected to said cylindrical skirt.

2. A valve as recited in claim 1, wherein said joint is of annular cross-section and has a diametral section in the form of a T, terminating on its periphery in an annular cylindrical lip.

3. A valve as recited in claim 1, in which said plug defines a bore, and a connection from said bore to a source of compressed fluid.

4. A valve as recited in claim 3, wherein said source of compressed fluid is a hydraulic or gas accumulator.

5. A valve as recited in claim 1, wherein said hollow needle has a blind end, with radial bores near said blind end and defined by the wall of said needle.

6. A valve as recited in claim 1, wherein said hollow needle defines a bore at its end, a rod the diameter of which is less than said bore diameter in said bore, and a displaceable plug enclosed in an annular cavity defined by said joint and actuated by said rod.

7. A valve as recited in claim 1, wherein the end of said hollow needle is rounded and defines a bore, said end being covered by said flexible joint.

8. A valve as recited in claim 3, wherein said joint is located within a cavity which surrounds said joint, said cavity being separated and sealed by a deformable annular lip on said joint from a small lateral opening defined by a wall of said valve to provide entry of said compressed fluid into a compression chamber.

9. A valve as recited in claim 1, wherein one end of said flexible joint is provided with a rigid shaped support limiting the amplitude of dilatation of said joint, said support being formed by a metal member defining a round depression and a cylindrical skirt, and a sealed chamber containing a gas under pressure communicating with the bottom of said depression.

10. A valve as recited in claim 9 wherein said metal member slides freely in the body of said valve, a return spring opposing said sliding action, a piston sliding with a sealing effect within said body and carrying said needle, and resilient means normally keeping said piston applied to a fixed seat, said piston being capable of displacement from said seat in the event of instantaneous excess pressure to connect the prop feed pipe directly with a transverse evacuation passage.

11. A valve as recited in claim 10, wherein said resilient means for the return of said piston includes a spring and a cushion of compressed gas contained in a chamber.

12. A slide valve as recited in claim 10 wherein one end said piston comprises a plane sealing face applied to said seat.

References Cited

UNITED STATES PATENTS 2,651,322 9/1953 Hendry _____ 137—525
2,890,838 6/1959 Jannsen _____ 137—525.1 XR
1,800,066 4/1931 Glass _____ 137—525

WILLIAM F. O'DEA, Primary Examiner

W. H. WRIGHT, Assistant Examiner

U.S. Cl. X.R.

137—525.1; 251—61.1